March 28, 1933.  F. H. BELL  1,902,987
SAFETY GLASS SEALING INSTRUMENT
Filed Sept. 15, 1931
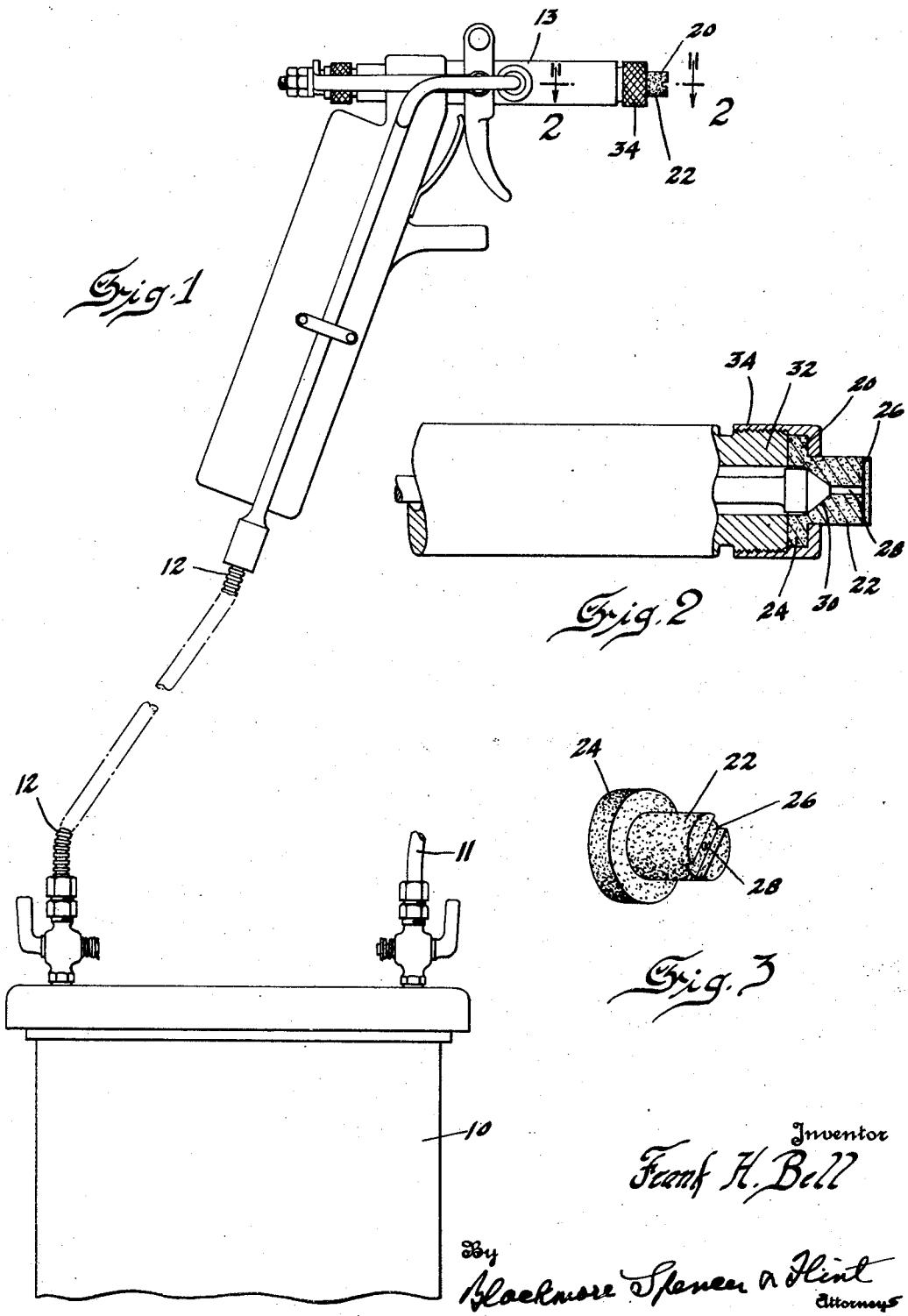

Patented Mar. 28, 1933

1,902,987

UNITED STATES PATENT OFFICE

FRANK H. BELL, OF DETROIT, MICHIGAN, ASSIGNOR TO GENERAL MOTORS CORPORATION, OF DETROIT, MICHIGAN, A CORPORATION OF DELAWARE

SAFETY GLASS SEALING INSTRUMENT

Application filed September 15, 1931. Serial No. 562,929.

This invention relates to instrumentalities for applying sealing or luting material to the edges of laminated transparencies of the type commonly known as safety glass. Transparencies of this type consist of two plates of glass and an interposed layer of tough flexible and transparent material bonded to the glass. The interposed flexible layer may be composed of cellulose nitrate, cellulose acetate, or any suitable substitute.

In order to preserve the non-splinterable property of these transparencies when subjected to a shock or blow it is necessary that the adhesion or bond between the flexible intermediate layer and the glass plates be maintained, because wherever the adhesion is broken the transparency is no longer non-splinterable at the locality of the broken adhesion, which is commonly called in this art a "let-go". Furthermore, the "let-goes" are unsightly and interfere with vision.

One of the causes of "let-goes" is believed to be the penetration of water and moist atmosphere, under various temperature conditions, between the flexible layer and the glass plates, the moisture obtaining entrance at the edges of the assembly. Another cause of "let-goes" in transparencies assembled by the use of adhesives or solvents and plasticizers used to render the flexible layer "tacky" preparatory to assembling, is believed to be due to evaporation of ingredients of adhesives and solvents. Deterioration of safety glass due to penetration of moist atmosphere and water and to evaporation of solvents, or other substances utilized to bond the glass and flexible layer, may be prevented or minimized by hermetically sealing or luting the edges of the assembly with a water resistant sealing or luting substance, which may be applied in more or less fluid condition.

In order most effectively to provide for retention of the sealing substance the intermediate layer is made of less area than the glass so as to leave a shallow channel for the reception of the sealing substance extending inward perhaps one eighth of an inch more or less. This channel may be formed by cutting the flexible intermediate sheet smaller than the glass or by routing out the flexible material to the required depth after the flexible layer and glass plates have been finally pressed together.

This invention involves a novel form of nozzle, designed to constitute the terminal of a flexible tube connected with a source of fluid sealing or luting substance under pressure, the flow of which may be controlled by a valve under control of the artisan applying the substance.

In the accompanying drawing,

Fig. 1 illustrates a complete apparatus for applying fluid sealing substance;

Fig. 2 is a section on line 2—2, Fig. 1, and

Fig. 3 is a perspective view of a nozzle formed in accordance with this invention.

In the drawing, 10 indicates a receptacle containing fluid sealing material which is under air pressure supplied through a tube 11 from an air pump or other means for compressing air not shown. A flexible delivery tube 12 is shown connected to a pipe that dips down into the sealing fluid in the receptacle 10. At its delivery end the flexible tube 11 is connected to valved control device 13 by which the discharge of the sealing fluid may be controlled. The combination thus far described is old.

This invention consists of a nozzle attachment to the control device through which the sealing material may be extruded and neatly guided and deposited with facility into the sealing channel of the transparency. The nozzle referred to is indicated by numeral 20. It consists of a perforated cylindrical body 22 having an enlarged flange 24, and a guiding groove 26 across the end of the body. The groove should be of a width to admit the edge of the transparency nicely within it. The perforation comprises a small duct 28 of a diameter approximately equal to the width of the space between the glass plates, and a larger hopper like cavity 30 in communication. The small duct terminates midway of the groove 26.

The nozzle 20 may be coupled to the threaded terminal 32 of the control device 13 by a cup shaped fitting 34 the interior of which is threaded, and the bottom of which is provided with a hole through which the body 22 of the coupling may project. Thus the fitting 34 when screwed tight will compress the flange 24 tightly against the ends of the flow control device.

Coupling 20 is preferably composed wholly of some slightly yielding elastic material, preferably rubber, which will not scratch glass and which may be pressed yieldingly against the edge of the transparency during the operation of applying the sealing substance, and may be snugly coupled to the end or control device on tube 12. But a nozzle wherein the guide groove is lined with yieldable elastic material gives good results.

In use the operator applies the nozzle to the edge of the transparency, the edge of the latter fitting within the groove 26. Then after opening the control valve the nozzle is drawn along the edge to project the sealing substance into the groove in the edge of the transparency. The form of the nozzle and the elastic substance thereof enables the sealing substance to be deposited neatly and rapidly without permitting escape thereof in such manner as to smear the glass.

I claim:

1. An instrument for the purpose set forth comprising a nozzle having a transverse parallel sided guide groove the walls of which are of yieldable material and a duct opening into the groove.

2. An instrument for the purpose set forth comprising a nozzle composed of yieldable material having a transverse parallel sided guide groove and a duct opening into the groove.

3. An instrument for the purpose set forth comprising a nozzle composed of rubber and having a securing flange, a transverse parallel sided guide groove, and a duct opening into the groove.

In testimony whereof I affix my signature.

FRANK H. BELL.